United States Patent
Goetzelmann et al.

(10) Patent No.: US 6,284,326 B1
(45) Date of Patent: Sep. 4, 2001

(54) PROCESS FOR PRODUCING AN ADHESIVE COATING ON POLYMETHYL METHACRYLATE (PMMA) SUBSTRATE SURFACES

(76) Inventors: Rainer Goetzelmann, Karl-Arnold-Strasse 53, D-63456, Hanau; Heinrich Gruenwald, Freigerichtstrasse 16, D61194, Niddatal; Friedrich Scheerer, Ulmenstrasse 13, D-35606, Niederbiel; Joerg Terhuerne, Asterweg 62, D-35390, Giessen; Alfons Zoeller, Ketteler Strasse 24, D-63628, Bad Soden-Salmuenster, all of (DE)

( * ) Notice: Subject to any disclaimer, the term of this patent is extended or adjusted under 35 U.S.C. 154(b) by 0 days.

(21) Appl. No.: 09/155,341
(22) PCT Filed: Mar. 21, 1997
(86) PCT No.: PCT/DE97/00582
  § 371 Date: Sep. 28, 1998
  § 102(e) Date: Sep. 28, 1998
(87) PCT Pub. No.: WO97/35912
  PCT Pub. Date: Oct. 2, 1997

(30) Foreign Application Priority Data

Mar. 27, 1996 (DE) .............................. 196 11 936

(51) Int. Cl.[7] ...................................... C08J 7/18
(52) U.S. Cl. .......................... 427/491; 427/296; 427/302; 427/322; 427/385.5; 427/399; 427/536; 427/569
(58) Field of Search ..................... 427/491, 536, 427/569, 296, 302, 322, 385.5, 399

(56) References Cited

U.S. PATENT DOCUMENTS

5,007,928  *  4/1991  Okamura et al. .
5,015,523  *  5/1991  Kawashima et al. .
5,451,453  *  9/1995  Gagnon et al. .

FOREIGN PATENT DOCUMENTS

0 482 615        4/1992  (EP) .
58-147431   *   2/1982  (JP) .
62-092250A  *   4/1987  (JP) .
05179034A   *   6/1993  (JP) .

OTHER PUBLICATIONS

Makromolekuele, Hans–Georg Elias, 3rd Edition (1975), pp. 680–683 (No month avail).

Yasuda, "Glow Discharge Polymerization", Thin Film Processes, pp. 360–369, (1978) (No. month avail).

* cited by examiner

Primary Examiner—Bernard Pianalto
(74) Attorney, Agent, or Firm—Foley & Lardner

(57) ABSTRACT

An adhesive coating with optical and/or mechanical functions is applied to a PMMA substrate surface, a organic compound which is polymerized by radicals being used as the adhesive-providing layer. The coating with the optical and/or mechanical function(s) is obtained after radical-induced polymerization of the adhesive-providing layer.

15 Claims, No Drawings

PROCESS FOR PRODUCING AN ADHESIVE COATING ON POLYMETHYL METHACRYLATE (PMMA) SUBSTRATE SURFACES

BACKGROUND OF THE INVENTION

The invention relates to a process for producing a firmly adhering coating on polymethyl metacrylate [sic] (PMMA) substrate surfaces.

In addition to glass, transparent plastics are increasingly being used for the production of optically imaging constructional elements, such as lenses and prisms. PMMA in particular has proven itself in this context. A key disadvantage of the optical components produced from PMMA is their relatively soft surface, which can easily be damaged by scratches. It is therefore common to protect the surface by vapor deposition of quartz ($SiO_2$) or else by plasma-polymerized silicon compounds. It is also possible to coat the surfaces with optical functional layers in order, for example, to reduce reflection.

It has unfortunately turned out to be the case that the coatings chosen to date do not adhere very firmly. Under thermal stress, the layers become detached or cracks form which, although without disruptive effect in the case of spectacle lenses, for example, are not tolerable in the case of precision optics. In the case of injection molded optical components in particular the so-called spray skin is subject to higher mechanical stress and exhibits poor adhesiveness for applied coatings.

From EP 0 482 615 A1 it is known to provide the surfaces of various polymer materials with a poly(hydroxyethyl acrylate) coating which is intended to provide improved wettability, printability, adhesiveness, antistatic properties and freedom from misting. The special coating is to be produced by one of the known processes of addition polymerization. According to the stated process parameters the surface to be coated is first of all exposed under vacuum to the poly(hydroxyethyl acrylate) in vapor form, after which a plasma discharge is initiated by means of which the coating is polymerized. The coating operation constitutes a final treatment of the polymer surface.

SUMMARY OF THE INVENTION

The invention was therefore based on the object of specifying a process for producing, on PMMA surfaces, a coating which is resistant to thermal and mechanical stresses, is largely neutral from an optical standpoint and which adheres firmly even to injection molded components. The coating itself should, moreover, be able to be coated again with optical functional layers.

With a process of the type specified at the outset this object is achieved in accordance with the invention by the features of claim 1. Advantageous developments are evident from the features of the subclaims.

DETAILED DESCRIPTION OF A PREFERRED EMBODIMENT

A key concept of the invention is to provide a coating which adheres firmly to PMMA and which itself serves as an adhesion-promoting interlayer for further coatings. Organic starting compounds which can be addition polymerized by a free-radical mechanism are chosen as the coating substance, and are normally referred to as monomers. These monomers are, in accordance with the invention, caused to undergo addition polymerization by means of initiator radicals produced from a plasma. The process is therefore one of plasma-induced addition polymerization.

The process of causing monomers to add onto other macromolecules by addition polymerization is known per se and is also referred to as graft polymerization. The textbook MAKROMOLEKÜLE, Hans-Georg Elias, 3rd edition (1975), pages 680–683, gives examples of reactive groups. This reference also reveals that free radicals are able to initiate the addition polymerization and that polymers can be activated by means, for example, of UV radiation or gamma radiation.

It has surprisingly now been found that the plasma-induced addition polymerization of monomers on PMMA leads to a very firmly adhering and adhesion-promoting coating which is capable of compensating mechanical stresses in the interfaces. The PMMA substrate surface that is to be coated, and the reactive starting compounds for the coating (monomers), are exposed only briefly to the plasma. In this context, a low-pressure plasma has been found particularly suitable. The duration and timing of the plasma exposure depend on the nature of the coating and on the layer thickness of the monomer used, and can be optimized by experimentation.

The coating of the optical components, produced from PMMA, by a plasma-induced addition polymerization of a monomer does not alter the optical quality of the surface of precision optical components and advantageously permits subsequent coating with optical and physico-mechanical functions, such as antireflection, optical splitter, mirror, dichroic and dielectric layers, and also abrasion and wear layers, or layers for increasing the environmental stability.

The FIGURE shows, diagrammatically, a suitable coating unit. It is described below in connection with coating sequences that are indicated by way of example.

A commercially customary vapor deposition unit, such as that of type APS 1104 from Leybold Systems, comprises an electrically heated evaporator with a molybdenum crucible 1 and an electron beam evaporator 3 with an evaporator crucible 2. Opposite the evaporators there is a rotatable, dome-shaped substrate holder 4 in which, for example, injection molded lenses have been placed. The plasma is produced using an ion source 5 of type APS (Advanced Plasma Source), with a cylindrical anode 7 and a cathode 8. All of the functional elements are arranged in a vacuum chamber 6 which can be evacuated to the desired operating pressure by way of a diffusion pump unit, which is not depicted. Likewise not depicted are protective shields which can be swiveled out of their positions in front of the electron beam evaporator 3 and in front of the ion source 5 and are intended for providing controllable interruption of the emissions, which are depicted by means of arrows.

Coupled with the substrate holder 4 there is also a vibrating quartz measuring system 9 for measuring the geometric thickness of the layers applied to the substrate.

In one exemplary embodiment the molybdenum crucible 1 was filled with about 5 ml of the diethylene glycol bisalkyl carbonate monomer, which forms crosslinked layers that are substantially transparent in the visible region and carries two polymerizable groups per molecule.

The boiling point of this monomer, at 160° C. under a pressure of 2 torr, is very high and it must therefore be evaporated under vacuum using a thermal evaporator. This in fact has the advantage that the layer of liquid condensed onto the substrate surfaces that are to be coated remains stable under vacuum and exhibits no significant desorption.

The use of other monomers known from conventional polymer chemistry is possible, examples being vinyl, ethynyl, nitrile or epoxy compounds. These can be stored in reservoir tanks outside the vacuum chamber 6 and introduced into the crucible 1 via a filling line 10, together with stabilizers if desired. Monomers having at least one C—C double or triple bond, or one C—N triple bond, have been found advantageous.

Commercially customary $SiO^2$ granules were placed in the evaporator crucible 2. By this means it was possible to apply not only the coating of the invention but also a quartz scratch resistance layer.

The vacuum chamber was evacuated to a pressure of approximately $5 \cdot 10^{-5}$ mbar and then argon was let in to a pressure of $10^{-4}$ mbar. The argon is located in a reservoir flask outside the vacuum chamber and is normally passed directly through a filling line 11 into the ion source 5, where it serves as the plasma discharge gas.

As the discharge gas it is preferred to use noble gases, although it is also possible to employ other inorganic permanent gases, such as nitrogen, for example, or mixtures with noble gases.

By application of a voltage of about 150 V to the cathode 8 a low-pressure plasma was ignited which propagates from the cathode 8 to the substrate holder 4. The discharge current in this case is between 30 and 60 A. After about 15 seconds, the plasma was switched off and the crucible 1 was heated to a temperature at which the monomer evaporates and is deposited on the lens surfaces held in the substrate holder 4. The typical switch-on period of the plasma for inducing the polymerization is between 5 to [sic] 30 seconds.

The collision of ions and/or highly electronically excited atoms and molecules and/or the action of UV rays, produced by the plasma, causes production on the lens surfaces of initiator radicals which cause the monomers to polymerize. The polymer layer produced is attached covalently to the polymer chains of the components that are to be coated. This is the fundamental prerequisite for excellent adhesion.

By renewed ignition of the argon plasma over a longer period of from about 1 to 60 minutes in duration it is possible to cause the initially polymerized layer to undergo further polymerization. This leads to an increased crosslinking density and grafting density with the substrate surface.

It is particularly advantageous if the $SiO_2$ protective layer, for example, is applied by vapor deposition at the same time as the second plasma ignition. This produces a strengthened attachment of the $SiO_2$ layer to the polymerized monomer layer. In this context it has been observed that the plasma with its UV radiation, even through an already closed $SiO_2$ layer, also brings about lasting activation of the polymerization through the production of free radicals. Success is manifested in an increasing cure of the layer.

As an alternative to evaporation it is possible to apply the monomer compounds in liquid form to the substrate surface, such as by spraying, spin coating or condensing, for example. The layer of monomer liquid can subsequently be comprehensively polymerized under the action of a low-pressure plasma. This procedure has the advantage that the applied monomer layer protects the sensitive substrate surface against the plasma, so that it is possible to operate even at a relatively high plasma intensity and with a relatively long plasma duration. This also means that relatively thick layers of a few hundred nm can also be produced as adhesion-promoting polymer layer.

A lens produced from PMMA was provided with the adhesion-promoting polymerized monomer layer and with a quartz protective layer and was subjected to a condensation test, several solvent tests and a low-temperature test in comparison with a PMMA lens coated directly with quartz. In the case of the process of the invention, no instances of detachment, cracking or graying were found even under microscopic examination, whereas the conventionally produced protective layer flaked off.

What is claimed is:

1. A process for producing a firmly adhering coating with optical and/or mechanical functions on a polymethyl methacrylate substrate surface, comprising:

(a) the substrate surface is free-radicalized by a brief exposure to a low-pressure plasma, comprising a time of up to approximately 30 seconds, in a first step, (b) subsequently a free-radically polymerizing organic monomer compound is applied as an adhesion-promoting layer in a second step, and (c) following free-radically induced polymerization of the adhesion-promoting layer, performed by the combined influence of the first and second steps, coating with the optical and/or mechanical function takes place in a third step.

2. A process according to claim 1, wherein an $SiO_2$ layer is used as the coating with mechanical function.

3. A process according to claim 1, wherein said coating with the optical and/or mechanical function takes place under simultaneous exposure to a plasma.

4. A process according to claim 1, wherein said adhesion-promoting layer comprises a mono-, di- or trifunctional monomer.

5. A process according to claim 1, wherein the adhesion-promoting layer is applied by vapor deposition.

6. A process for producing a firmly adhering coating with optical and/or mechanical functions on a polymethyl methacrylate substrate surface, comprising:

(a) a free-radically polymerizing organic monomer compound is applied as an adhesion-promoting layer in a first step, (b) said adhesion-promoting layer is subsequently free-radicalized by brief exposure to a low-pressure plasma comprising a time of up to about 30 seconds, in a second step, and (c) following the free-radically induced polymerization of the adhesion-promoting layer, performed by the combined influence of the first and second steps, coating with the optical and/or mechanical function takes place in a third step.

7. A process for producing a firmly adhering coating with optical and/or mechanical functions on a polymethyl methacrylate substrate surface comprising:

free-radicalizing the substrate surface by brief exposure to a low-pressure plasma;

applying a free-radically polymerizing organic monomer to said surface as an adhesion-promoting layer;

coating said surface with a compound capable of imparting scratch resistance in order to produce said optical and/or mechanical function.

8. A process according to claim 7, wherein said step of free-radicalizing the substrate surface occurs prior to said step of applying said organic monomer.

9. A process according to claim 7, wherein said step of applying said organic monomer occurs prior to said step of free-radicalizing the substrate surface.

10. A process according to claim 7, wherein after said step of applying said organic monomer, said monomer free-radically polymerizes to form said adhesion-promoting layer.

11. A process according to claim 7, wherein said monomer undergoes addition polymerization by means of initiator radicals produced by said plasma.

12. A process according to claim 7, wherein said low pressure plasma is applied at a voltage of about 150 V with a discharge current between 30 and 60 A.

13. A process according to claim 7, wherein said brief exposure comprises a time between 5 and 30 seconds.

14. A process according to claim 7, wherein said compound capable of imparting scratch resistance comprises $SiO_2$.

15. A process according to claim 7, wherein said compound capable of imparting scratch resistance comprises an inorganic compound.

\* \* \* \* \*

UNITED STATES PATENT AND TRADEMARK OFFICE
CERTIFICATE OF CORRECTION

PATENT NO. : 6,284,326 B1
DATED : September 4, 2001
INVENTOR(S) : Rainer Goetzelmann et al.

It is certified that error appears in the above-identified patent and that said Letters Patent is hereby corrected as shown below:

<u>Title page,</u>
Item [73] Assignee was omitted. Please insert:
-- Leica Microsystems Wetzlar GmbH, Wetzlar, Federal Republic of Germany --;
-- Leica Camera AG, Solms, Federal Republic of Germany --;
-- Leybold Systems GmbH, Hanau, Federal Republic of Germany --.

Signed and Sealed this

Fourteenth Day of May, 2002

*Attest:*

JAMES E. ROGAN
*Attesting Officer*     *Director of the United States Patent and Trademark Office*